United States Patent
Peng et al.

(10) Patent No.: US 10,574,570 B2
(45) Date of Patent: Feb. 25, 2020

(54) COMMUNICATION PROCESSING METHOD AND APPARATUS

(71) Applicant: Beijing Baidu Netcom Science and Technology Co., Ltd., Beijing (CN)

(72) Inventors: Tao Peng, Beijing (CN); Yi Yang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 15/534,568

(22) PCT Filed: Dec. 3, 2015

(86) PCT No.: PCT/CN2015/096232
§ 371 (c)(1),
(2) Date: Jun. 9, 2017

(87) PCT Pub. No.: WO2017/028398
PCT Pub. Date: Feb. 23, 2017

(65) Prior Publication Data
US 2018/0205644 A1     Jul. 19, 2018

(30) Foreign Application Priority Data

Aug. 20, 2015  (CN) .......................... 2015 1 0516380

(51) Int. Cl.
*H04L 12/46*       (2006.01)
*H04L 12/741*      (2013.01)
(Continued)

(52) U.S. Cl.
CPC ........ *H04L 45/586* (2013.01); *H04L 12/4641* (2013.01); *H04L 45/745* (2013.01); *H04L 61/103* (2013.01)

(58) Field of Classification Search
None
See application file for complete search history.

(56) References Cited

U.S. PATENT DOCUMENTS 6,804,247 B1 * 10/2004 Sasyan ................ H04L 12/4608
370/395.6
7,352,726 B2 * 4/2008 Fujisawa ........... H04L 29/12018
370/338
(Continued)

FOREIGN PATENT DOCUMENTS

CN           1754161 A      3/2006
CN         103095584 A      5/2013
(Continued)

OTHER PUBLICATIONS

International Search Report corresponding to International Patent Application No. PCT/CN2015/096232, State Intellectual Property Office of the P.R. China, dated May 18, 2016; (2 pages).

*Primary Examiner* — Noel R Beharry
*Assistant Examiner* — Ruihua Zhang
(74) *Attorney, Agent, or Firm* — Nixon Peabody LLP

(57) ABSTRACT

The present application discloses a communication processing method and apparatus. A specific implementation of the method includes: receiving, through a tunnel bridge to a first physical machine, a packet sent from a virtual machine, the first physical machine being a host machine of the virtual machine; determining whether the packet is an Address Resolution Protocol (ARP) request packet, and obtaining a destination address of the packet; if the packet is the ARP request packet and a destination address of the packet is not an address of a virtual machine in the first physical machine, writing a predetermined pseudo physical address into an ARP response and returning the ARP response; and if the packet is not the ARP request packet, sending the packet to a terminal associated with the destination address of the packet. This implementation reduces load of network nodes.

15 Claims, 5 Drawing Sheets

(51) Int. Cl.
*H04L 29/12* (2006.01)
*H04L 12/713* (2013.01)

(56) References Cited

U.S. PATENT DOCUMENTS

| | | | |
|---|---|---|---|
| 2006/0075484 | A1 | 4/2006 | Yang |
| 2008/0080539 | A1* | 4/2008 | Hong .................. H04L 45/7453 370/402 |
| 2013/0145002 | A1 | 6/2013 | Kannan et al. |
| 2015/0281048 | A1* | 10/2015 | Agarwal .................. H04L 45/44 370/236 |
| 2016/0112329 | A1* | 4/2016 | Ding .................. H04L 12/6418 370/235 |
| 2016/0197831 | A1* | 7/2016 | De Foy ............... H04L 45/7453 370/392 |
| 2016/0352538 | A1* | 12/2016 | Chiu .................. H04L 12/6418 |

FOREIGN PATENT DOCUMENTS

| | | |
|---|---|---|
| CN | 103139077 A | 6/2013 |
| CN | 104301451   | 1/2015 |
| CN | 104486192   | 4/2015 |
| CN | 104780105 A | 7/2015 |
| CN | 104853001 A | 8/2015 |

\* cited by examiner

COMMUNICATION PROCESSING METHOD AND APPARATUS

CROSS-REFERENCE TO RELATED APPLICATION

This application is a U.S. National Stage of International Application No. PCT/CN2015/096232, filed Dec. 3, 2015, which is related to and claims priority from Chinese Application Ser. No. 201510516380.9, filed on Aug. 20, 2015, the entire disclosures of which are hereby incorporated by reference in their entireties.

TECHNICAL FIELD

The present application relates to the field of computer technology, specifically to the field of data exchange network technology, and more specifically to a method and apparatus for communication processing between different subnets in a virtual network.

BACKGROUND

Currently, to implement communication between two different subnets, a router needs to be installed on a network node outside the two subnets to configure a static routing rule. Packets need to be sent to that network node for relay, so as to implement cross-subnet network communication.

However, because the network node is responsible for meeting traffic requirements for communicating to the external network, prior art implementations require the network node responsible for communication with the external network to handle the traffic that logically belongs to an intranet, leading to overload of the network node.

SUMMARY

An objective of the present application is to provide an communication processing method and apparatus, so as to solve the technical problems mentioned in the Background section.

According to a first aspect, the present application provides a communication processing method. The method comprises: receiving, through a tunnel bridge to a first physical machine, a packet sent from a virtual machine, the first physical machine being a host machine of the virtual machine; determining whether the packet is an Address Resolution Protocol (ARP) request packet; if the packet is the ARP request packet and a destination address of the packet is not an address of a virtual machine in the first physical machine, writing a predetermined pseudo physical address into an ARP response and returning the ARP response; and if the packet is not the ARP request packet, sending the packet to a terminal associated with the destination address of the packet.

In some embodiments, the method further comprises: if the packet is the ARP request packet and the destination address of the packet is an address of the virtual machine in the first physical machine, returning the ARP response through an integration bridge to the first physical machine.

In some embodiments, the sending the packet to a terminal associated with the destination address of the packet comprises: matching the packet with a first flow table by using a virtual local area network identification (VLAN ID) of the packet and a destination Internet Protocol (IP) address, wherein the first flow table is used for instructing sending the packet to a second physical machine by means of a tunneling technique, and the second physical machine is a host machine for a virtual machine associated with the destination IP address of the packet; and if there is no match in the first flow table for the packet, sending the packet to a Software Defined Networking (SDN) controller, querying for a destination VLAN ID and a destination IP address by using the controller, generating a first new flow table, inserting the first new flow table into the first flow table, and sending the packet to the second physical machine according to the first new flow table by means of a tunneling technique.

In some embodiments, the sending the packet to a Software Defined Networking (SDN) controller comprises: matching the packet with a second flow table by using Classless Inter-Domain Routing (CIDR) of the packet, wherein the second flow table is used for instructing sending the matched packet to the controller.

In some embodiments, the sending the packet to a terminal associated with the destination address of the packet further comprises: if there is no match in the second flow table for the packet, matching the packet with a third flow table according to a source VLAN ID of the packet, wherein the third flow table is used for instructing sending the packet to a network node of a gateway associated with the destination IP address of the packet; and if there is no match in the third flow table for the packet, uploading the packet to the controller, generating a second new flow table by using the controller, sending the packet to the network node of the gateway associated with the destination IP address of the packet according to the second new flow table, and inserting the second new flow table into the third flow table.

In some embodiments, the uploading the packet to the controller comprises: matching the packet with a fourth flow table according to the source VLAN ID of the packet, wherein the fourth flow table is used for instructing uploading the matched packet to the controller.

According to a second aspect, the present application provides a communication processing method. The method comprises: receiving a packet through a tunnel bridge; matching the packet with a flow table according to a tunnel identification code, a destination physical address, and a destination Internet Protocol (IP) address of the packet, wherein the destination physical address in a header field of the flow table is a predetermined pseudo physical address, and the flow table is used for instructing changing a source physical address in the matched packet to the pseudo physical address, and change the destination physical address to a real physical address corresponding to the destination IP address of the packet; sending the packet to a virtual machine associated with a destination address of the packet; and sending a reply packet corresponding to the packet to a physical machine at a sending end by means of a tunneling technique.

In some embodiments, the sending the packet to a virtual machine associated with a destination address of the packet comprises: if there is locally a virtual machine associated with the destination IP address of the packet, sending the packet to the virtual machine; and if there is locally no virtual machine associated with the destination IP address of the packet, sending the packet to the controller, generating a flow table of a physical machine where the destination IP address of the packet is located by using the controller, and sending the flow table to the physical machine that sends the packet.

In some embodiments, the generating a flow table of a physical machine where the destination IP address of the packet is located by using the controller comprises: searching for the physical machine where the destination IP address of the packet is located by using the controller according to a tunnel identifier, a source IP address and the destination IP address of the packet, and generating the flow table.

According to a third aspect, the present application provides a communication processing apparatus. The apparatus comprises: a packet receiving unit, configured to receive, through a tunnel bridge to a first physical machine, a packet sent from a virtual machine, the first physical machine being a host machine of the virtual machine; a packet parsing unit, configured to determine whether the packet is an Address Resolution Protocol (ARP) request packet; an ARP response sending unit, configured to: when the packet parsing unit determines that the packet is the ARP request packet and a destination address of the packet is not an address of the virtual machine in the first physical machine, write a predetermined pseudo physical address into an ARP response and returning the ARP response; and a packet sending unit, configured to: when the packet parsing unit determines that the packet is not the ARP request packet, send the packet to a terminal associated with the destination address of the packet.

In some embodiments, the ARP response sending unit is further configured to: when the packet is the ARP request packet and the destination address of the packet is an address of the virtual machine in the first physical machine, returning the ARP response through an integration bridge to the first physical machine.

In some embodiments, the packet sending unit comprises: a first flow table matching unit, configured to match the packet with a first flow table by using a virtual local area network identification (VLAN ID) of the packet and a destination Internet Protocol (IP) address, wherein the first flow table is used for instructing sending the packet to a second physical machine by means of a tunneling technique, and the second physical machine is a host machine for a virtual machine associated with the destination IP address of the packet; and a first flow table generation unit, configured to: when there is no match in the first flow table for the packet, send the packet to a Software Defined Networking (SDN) controller, query for a destination VLAN ID and a destination IP address by using the controller, generate a first new flow table, insert the first new flow table into the first flow table, and send the packet to the second physical machine according to the first new flow table by means of a tunneling technique.

In some embodiments, the first flow table generation unit sending the packet to a Software Defined Networking (SDN) controller comprises: matching the packet with a second flow table by using Classless Inter-Domain Routing (CIDR) of the packet, wherein the second flow table is used for instructing sending the matched packet to the controller.

In some embodiments, the packet sending unit further comprises: a second flow table matching unit, configured to: when there is no match in the second flow table for the packet, match the packet with a third flow table according to a source VLAN ID of the packet, wherein the third flow table is used for instructing sending the packet to a network node of a gateway associated with the destination IP address of the packet; and a second flow table generation unit, configured to: when there is no match in the third flow table for the packet, upload the packet to the controller, generate a second new flow table by using the controller, send the packet to the network node of the gateway associated with the destination IP address of the packet according to the second new flow table, and insert the second new flow table into the third flow table.

In some embodiments, the second flow table generation unit uploading the packet to the controller comprises: matching the packet with a fourth flow table according to the source VLAN ID of the packet, wherein the fourth flow table is used for instructing uploading the matched packet to the controller.

According to a fourth aspect, the present application provides a communication processing apparatus. The apparatus comprises: a packet receiving unit, configured to receive a packet through a tunnel bridge; a flow table matching unit, configured to match the packet with a flow table according to a tunnel identification code, a destination physical address, and a destination Internet Protocol (IP) address of the packet, wherein the destination physical address in a header field of the flow table is a predetermined pseudo physical address, and the flow table is used for instructing changing a source physical address in the matched packet to the pseudo physical address, and change the destination physical address to a real physical address corresponding to the destination IP address of the packet; a packet sending unit, configured to send the packet to a virtual machine associated with a destination address of the packet; and a reply packet sending unit, configured to send a reply packet corresponding to the packet to a physical machine at a sending end by means of a tunneling technique.

In some embodiments, the packet sending unit comprises: a packet sending subunit, configured to: when there is locally a virtual machine associated with the destination IP address of the packet, send the packet to the virtual machine; and a flow table generation unit, configured to: when there is locally no virtual machine associated with the destination IP address of the packet, send the packet to the controller, generate a flow table of a physical machine where the destination IP address of the packet is located by using the controller, and send the flow table to the physical machine that sends the packet.

In some embodiments, the generating a flow table of a physical machine where the destination IP address of the packet is located by using the controller comprises: searching for the physical machine where the destination IP address of the packet is located by using the controller according to a tunnel identifier, a source IP address and the destination IP address of the packet, and generating the flow table.

According to the communication processing method and apparatus provided in the present application, the destination address rather than the ARP request packet of the virtual machine in the first physical machine is considered, and by writing a predetermined pseudo physical address into an ARP response and returning the ARP response, the ARP request packet only needs to be processed inside the first physical machine, and does not need to be processed by a network node, thereby reducing load of the network node.

BRIEF DESCRIPTION OF THE DRAWINGS

After reading detailed descriptions of non-limiting embodiments with reference to the following accompanying drawings, other features, objectives and advantages of the present invention will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
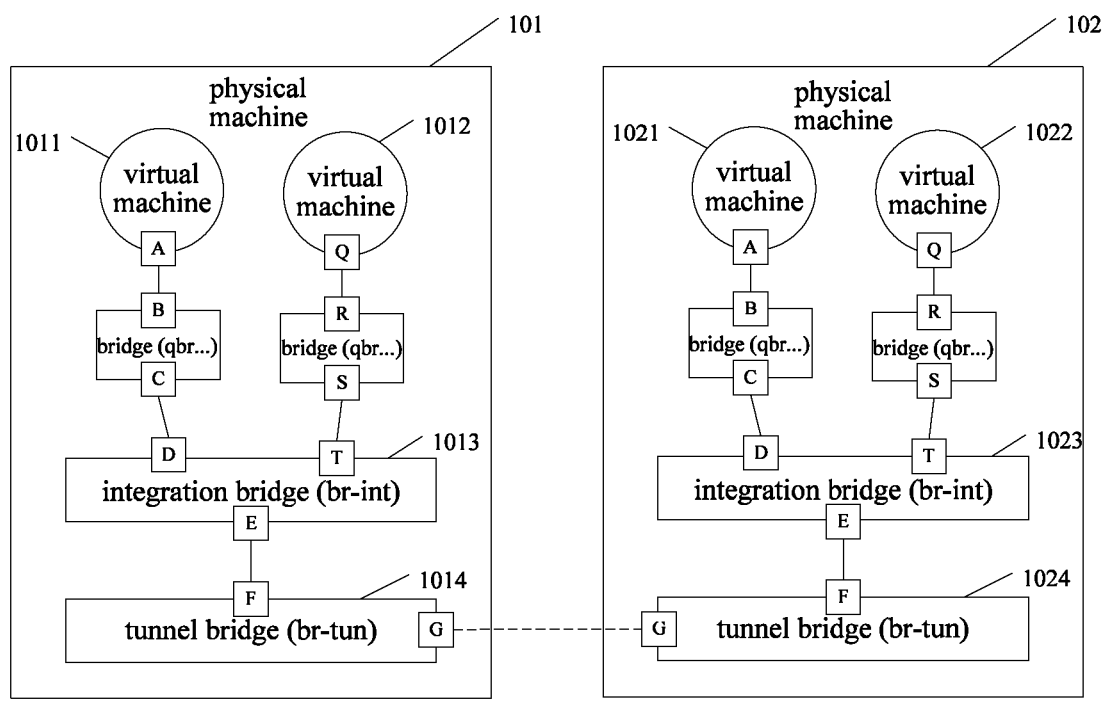
FIG. 1 is a schematic diagram of an exemplary network structure according to an embodiment of the present application.

FIG. 1 is a schematic diagram of an exemplary network structure applicable to the embodiments of the present application.

As shown in FIG. 1, the network structure includes a physical machine 101 and a physical machine 102. The physical machine 101 includes a virtual machine 1011 and a virtual machine 1012. The physical machine 102 includes a virtual machine 1021 and a virtual machine 1022. The virtual machine of each physical machine may be connected to an integration bridge (br-int) in the physical machine. An integration bridge 1013 and an integration bridge 1023 are virtualized bridges functioning as virtual switches to connect virtual machines on their respective computing nodes. The integration bridge 1013 and the integration bridge 1023 are respectively connected down to a tunnel bridge (br-tun) 1014 and a tunnel bridge (br-tun) 1024. The tunnel bridge 1014 and the tunnel bridge 1024 are also virtualized bridges, and communicate with tunnel bridges on other physical machines by means of respective Virtual eXtensible Local Area Network (VXLAN) tunnel devices G thereon, thus constituting a uniform communication layer. In this way, the function of connecting virtual machines on different computing nodes to virtual switches on a same logic. In FIG. 1, A and Q are virtual network adapters of corresponding virtual machines, B, D, T and R are kernel driver devices of the virtual network, C and S are virtual network adapters peer devices, and E and F are ports for associating the integration bridges and the tunnel bridges.

It should be understood that the numbers of physical machines, virtual machines, bridges and other devices in FIG. 1 are merely schematic. There may be any number of physical machines, virtual machines, bridges and other devices as required in practice Based on the network structure shown in FIG. 1, the present application provides a communication processing method and apparatus. The communication processing method and apparatus provided in the present application will be illustrated below through embodiments with reference to the accompanying drawings.

Figure 2:
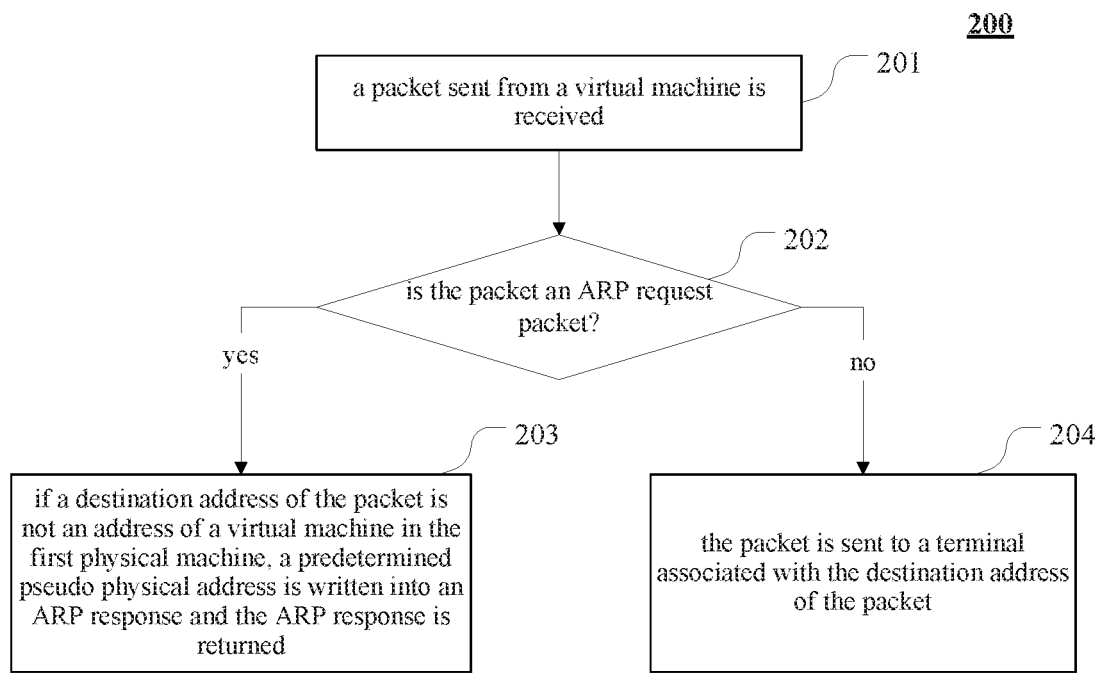
FIG. 2 is a flow chart of a communication processing method according to an embodiment of the present application.

FIG. 2 illustrates a flow 200 of a communication processing method according to an embodiment of the present application.

The flow 200 describes steps executed by a sending end of communication. Referring to FIG. 2, the communication processing method includes the following steps.

At step 201, a packet sent from a virtual machine is received through a tunnel bridge to a first physical machine, the first physical machine being a host machine of the virtual machine.

In this embodiment, the packet sent from the virtual machine is first sent to an integration bridge, and then the integration bridge sends the packet to a tunnel bridge. (For example, the virtual machine 1011 in FIG. 1 sends a packet to the integration bridge 1013, and then the integration bridge 1013 sends the packet to the integration bridge 1014.)

At step 202, it is determined whether the packet is an Address Resolution Protocol (ARP) request packet.

In this embodiment, if it is determined that the packet is the ARP request packet, step 203 is performed; otherwise, step 204 is performed.

At step 203, if a destination address of the packet is not an address of the virtual machine in the first physical machine, a predetermined pseudo physical address is written into an ARP response and the ARP response is returned.

In this embodiment, step 203 may be implemented by using a flow table. The flow table matches the ARP request packet of which the destination is not local, and instructs to write a pseudo physical address (for example, "12:34:56:78:9b:ai") into an ARP response and return the ARP response as an ARP response to the matched ARP request packet.

At step 204, the packet is sent to a terminal associated with the destination address of the packet.

In this embodiment, the packet in this step is a non-ARP packet (for example, an IP data packet), and specifically, the packet may be sent to a terminal associated with the destination address of the packet by performing the following steps:

The packet is matched with a first flow table by using a virtual local area network identification (VLAN ID) of the packet and a destination Internet Protocol (IP) address, where the first flow table is used for instructing sending the packet to a second physical machine by means of a tunneling technique, and the second physical machine is a host machine for a virtual machine associated with the destination IP address of the packet.

In this embodiment, the integration bridge assigns one VLAN ID to each physical machine, and because the physical address in the above-mentioned ARP response is the pseudo physical address, the destination IP address and the VLAN ID are used to match with the first flow table.

If there is no match in the first flow table for the packet, the packet is sent to a Software Defined Networking (SDN) controller, a destination VLAN ID and a destination IP address are queried for by using the controller, a first new flow table is generated, the first new flow table is inserted into the first flow table, and the packet is sent to the second physical machine according to the first new flow table by means of a tunneling technique.

In this embodiment, for example, the step of sending the packet to a Software Defined Networking (SDN) controller may include: matching the packet with a second flow table by using Classless Inter-Domain Routing (CIDR) of the packet, where the second flow table is used for instructing sending the matched packet to the controller.

By means of the processing at the above-mentioned step, when the first flow table is incomplete, the controller generates a first new flow table and inserts the first new flow table into the first flow table, so that subsequently when a packet is to be sent, the packet may be sent by directly matching with the first flow table.

By means of the processing at the above-mentioned step 201 to step 204, communication of a non-ARP request packet between different subnets in an intranet can be implemented.

In some optional implementations of this embodiment, the communication processing method according to this embodiment may further include: if the packet is the ARP request packet and the destination address of the packet is an address of a virtual machine in the first physical machine, returning the ARP response through an integration bridge to the first physical machine. In this way, a correct ARP response can be obtained for an ARP request of which the destination address is local.

According to the communication processing method provided in this embodiment of the present application, the destination address rather than the ARP request packet of the virtual machine in the first physical machine is considered, and by writing a predetermined pseudo physical address into an ARP response and returning the ARP response, the ARP request packet only needs to be processed inside the first physical machine, and does not need to be processed by a network node, thereby reducing load of the network node.

Further, for a non-ARP request packet, the packet is sent to the second physical machine according to the first flow table by means of a tunneling technique, and does not need to be processed by the network node, thereby further reducing load of the network node.

Figure 3:
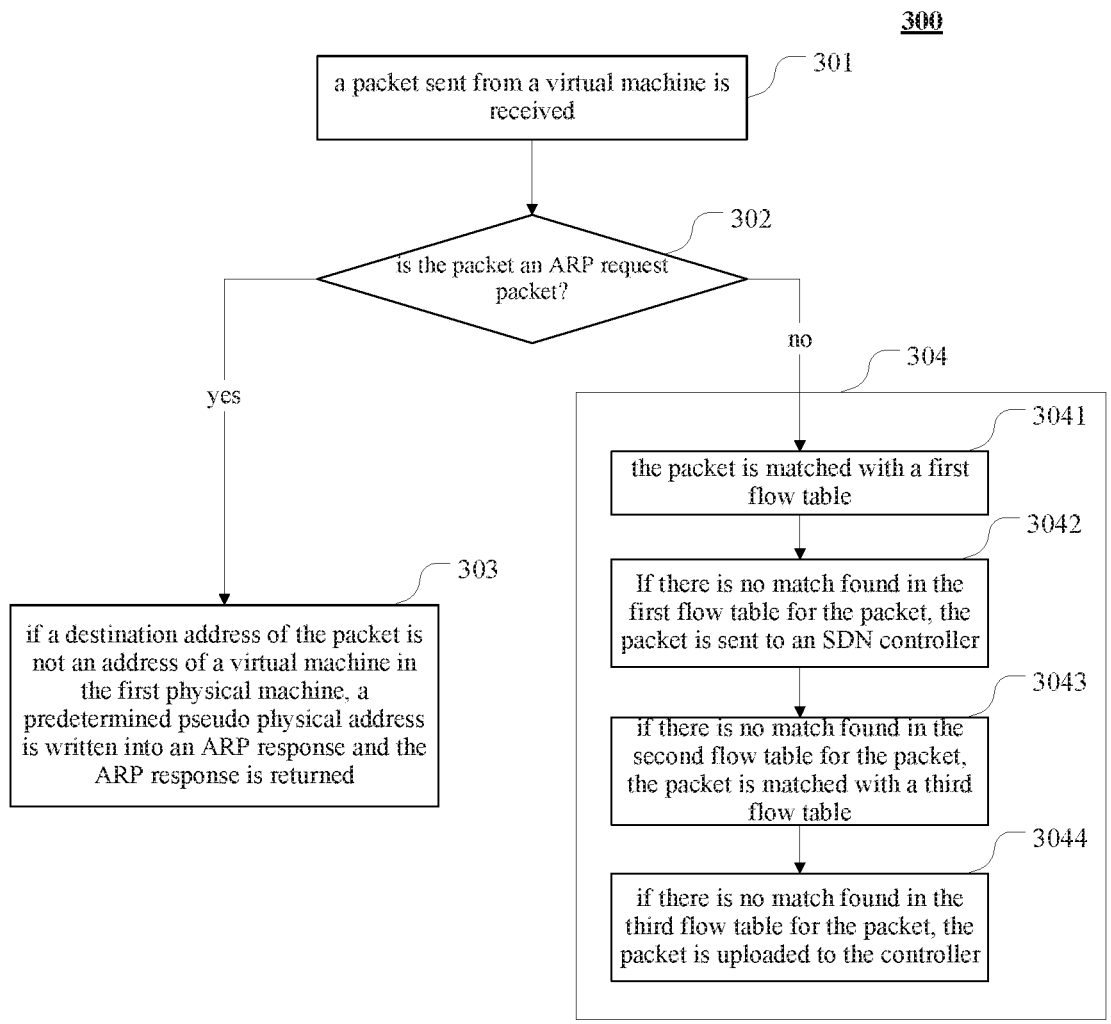
FIG. 3 is a flow chart of a communication processing method according to another embodiment of the present application.

FIG. 3 illustrates a flow 300 of a communication processing method according to another embodiment of the present application.

The flow 300 describes steps executed by a sending end of communication. Referring to FIG. 3, the communication processing method includes the following steps.

At step 301, a packet sent from a virtual machine is received through a tunnel bridge to a first physical machine, the first physical machine being a host machine of the virtual machine.

Specific implementation of step 301 in this embodiment can be referred to the implementation of step 201 in the embodiment corresponding to FIG. 1, and will not be repeatedly described here.

At step 302, it is determined whether the packet is the ARP request packet.

In this embodiment, if it is determined that the packet is the ARP request packet, step 303 is performed; otherwise, step 304 is performed.

At step 303, if a destination address of the packet is not an address of the virtual machine in the first physical machine, a predetermined pseudo physical address is written into an ARP response and the ARP response is returned.

Specific implementation of step 303 in this embodiment can be referred to the implementation of step 203 in the embodiment corresponding to FIG. 1, and will not be repeatedly described here.

At step 304, the packet is sent to a terminal associated with the destination address of the packet.

In this embodiment, the packet may be sent to a terminal associated with the destination address of the packet by performing the following steps:

At step 3041, the packet is matched with a first flow table by using a VLAN ID and a destination IP address of the packet, where the first flow table is used for instructing sending the packet to a second physical machine by means of a tunneling technique, and the second physical machine is a host machine for a virtual machine associated with the destination IP address of the packet.

At step 3042, If there is no match in the first flow table for the packet, the packet is sent to an SDN controller, a destination VLAN ID and a destination IP address are queried for by using the controller, a first new flow table is generated, the first new flow table is inserted into the first flow table, and the packet is sent to the second physical machine according to the first new flow table by means of a tunneling technique.

In this embodiment, communication between different subnets in an intranet can be implemented by using the first flow table and the second flow table. However, if the virtual machine needs to access an external network (for example, a public network), because the physical address in the above-mentioned returned ARP response is the pseudo physical address, no match in the first flow table and the second flow table. In this case, the following steps may be performed.

At step 3043, if there is no match in the second flow table for the packet, the packet is matched with a third flow table according to a source VLAN ID of the packet, where the third flow table is used for instructing sending the packet to a network node of a gateway associated with the destination IP address of the packet.

The need of the virtual machine to access an external network is solved by using the third flow table. However, it is possible that the third flow table is incomplete, and therefore, it is possible that no match is in the third flow table. In this case, step 3044 is performed.

At step 3044, if there is no match in the third flow table for the packet, the packet is uploaded to the controller, a second new flow table is generated by using the controller, the packet is sent to a network node of a gateway associated with the destination IP address of the packet according to the second new flow table, and inserting the second new flow table into the third flow table.

In this embodiment, for example, the uploading the packet to the controller may include: matching the packet with a fourth flow table according to the source VLAN ID of the packet, where the fourth flow table is used for instructing uploading the matched packet to the controller.

By means of the processing at step 3044, when the third flow table is incomplete, the controller generates a second new flow table and inserts the second new flow table into the third flow table. In this way, packets having a same address may be sent by matching with the third flow table.

Specific implementation of step 3041 to step 3042 in this embodiment and the technical effects achieved thereby can be referred to the implementation of step 204 in the embodiment corresponding to FIG. 1, and will not be repeatedly described here.

As can be seen, this embodiment is different from the embodiment corresponding to FIG. 2 in that the flow 300 of the communication processing method provided in this embodiment further includes step 3043 to step 3044 compared with the embodiment corresponding to FIG. 2. By means of the processing at step 3043 and step 3044, the problem of access of the virtual machine to an external network is solved.

Figure 4:
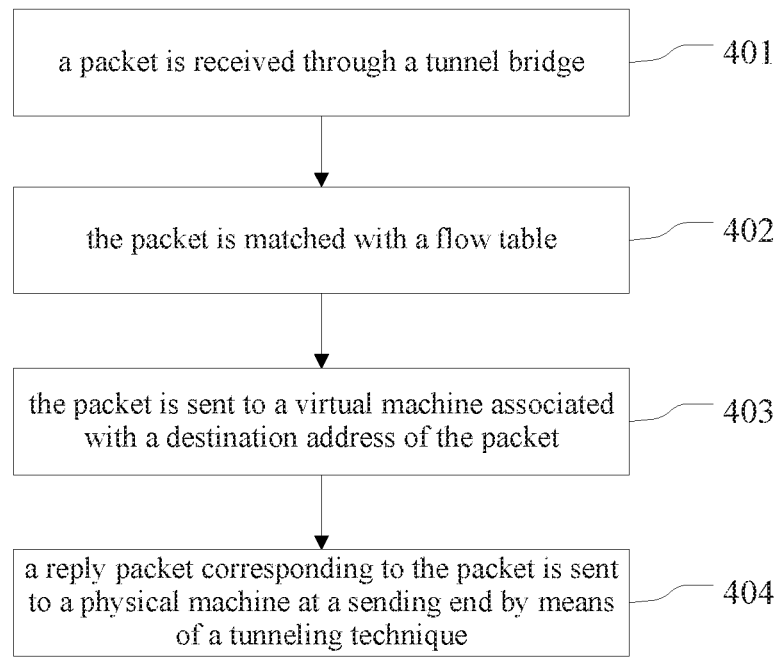
FIG. 4 is a flow chart of a communication processing method according to still another embodiment of the present application.

FIG. 4 illustrates a flow 400 of a communication processing method according to still another embodiment of the present application.

The flow 400 describes steps executed by a receiving end of communication. Referring to FIG. 4, the communication processing method includes the following steps.

At step 401, a packet is received through a tunnel bridge.

At step 402, the packet is matched with a flow table according to a tunnel identification code, a destination physical address, and a destination IP address of the packet, where the destination physical address in a header field of the flow table is a predetermined pseudo physical address, and the flow table is used for instructing changing a source physical address in the matched packet to the pseudo physical address, and change the destination physical address to a real physical address corresponding to the destination IP address of the packet.

At step 403, the packet is sent to a virtual machine associated with a destination address of the packet.

In this embodiment, for example, step 403 may include the following steps:

determining whether there is locally a virtual machine associated with the destination IP address of the packet; and if there is locally a virtual machine associated with the destination IP address of the packet, sending the packet the virtual machine associated with the destination IP address of the packet.

In this embodiment, the above-mentioned virtual machine is a destination virtual machine, and because the destination physical address in the matched packet is changed to the real physical address corresponding to the destination IP address of the packet at step 401, at this step, the packet may be directly sent to the destination virtual machine according to the latest physical address of the packet.

if there is locally no virtual machine associated with the destination IP address of the packet, it indicates that the destination virtual machine of the packet has been migrated. In this case, the following steps are performed: sending the packet to the controller, generating a flow table of a physical machine where the destination IP address of the packet is located by using the controller, and sending the packet the destination virtual machine according to the flow table.

In this embodiment, for example, the step of generating a flow table of a physical machine where the destination IP address of the packet is located by using the controller may include: searching for the physical machine where the destination IP address of the packet is located by using the controller according to a tunnel identifier, a source IP address and the destination IP address of the packet, and generating the flow table.

By means of the above-mentioned processing, when the virtual machine has been migrated and the flow table of the sending end has not been updated, the packet can still be sent to the physical machine where the virtual machine is currently located, thereby further improving the communication processing method of this embodiment.

At step 404, a reply packet corresponding to the packet is sent to a physical machine at a sending end by means of a tunneling technique.

In this embodiment, if there is locally a virtual machine associated with the destination IP address of the packet at step 403, the source physical address (which is the pseudo physical address) of the received packet is used as a destination physical address of a reply packet, and then the reply packet is sent to a physical machine at a sending end by means of a tunneling technique.

If there is locally no virtual machine associated with the destination IP address of the packet at step 403, the flow table generated at step 403 is sent to the physical machine at the sending end. In this way, packets subsequently sent to this virtual machine can be sent to the correct physical machine.

According to the communication processing method provided in this embodiment, by changing the destination physical address in the matched packet to the real physical address corresponding to the destination IP address of the packet, the packet can reach the correct destination virtual machine, thus completing the entire communication process. In addition, by changing the source physical address in the matched packet to the pseudo physical address, the reply packet does not need to be sent to the gateway for finding the sending end, and therefore does not need to be processed by the network node, thereby alleviating the load of the network node.

Figure 5:
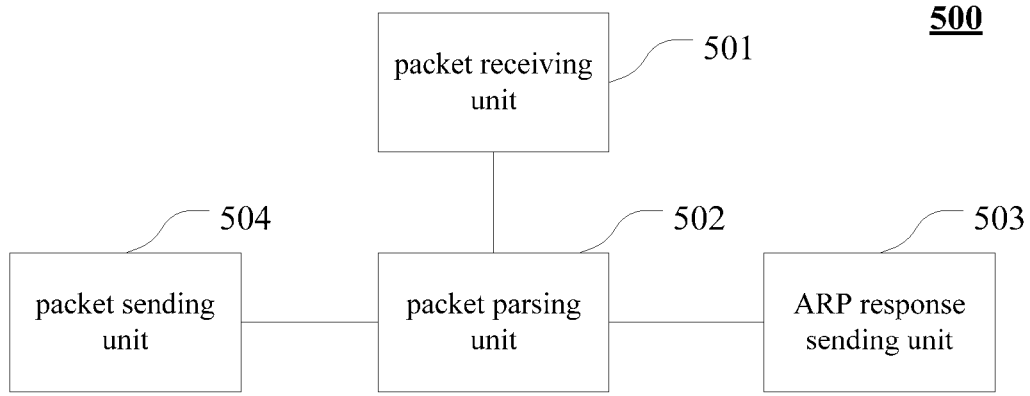
FIG. 5 is a schematic structural diagram of a communication processing apparatus according to an embodiment of the present application.

Referring to FIG. 5, as an implementation of the method shown in FIG. 2 or FIG. 3, the present application provides an embodiment of a communication processing apparatus. The apparatus may be specifically applied to the network structure shown in FIG. 1, and may be applied to a sending end of communication.

As shown in FIG. 5, the communication processing apparatus 500 according to this embodiment includes a packet receiving unit 501, a packet parsing unit 502, an ARP response sending unit 503, and a packet sending unit 504. The packet receiving unit 501 is configured to receive, through a tunnel bridge to a first physical machine, a packet sent from a virtual machine, the first physical machine being a host machine of the virtual machine. The packet parsing unit 502 is configured to determine whether the packet is an Address Resolution Protocol (ARP) request packet. The ARP response sending unit 503 is configured to: when the packet parsing unit 502 determines that the packet is the ARP request packet and a destination address of the packet is not an address of the virtual machine in the first physical machine, write a predetermined pseudo physical address into an ARP response and returning the ARP response. The packet sending unit 504 is configured to: when the packet parsing unit 502 determines that the packet is not the ARP request packet, send the packet to a terminal associated with the destination address of the packet.

According to the communication processing apparatus provided in this embodiment of the present application, the destination address rather than the ARP request packet of the virtual machine in the first physical machine is considered, and as the ARP response sending unit 503 writes a predetermined pseudo physical address into an ARP response and returns the ARP response, the ARP request packet only needs to be processed inside the first physical machine, and does not need to be processed by a network node, thereby reducing load of the network node.

In some implementations of this embodiment, the packet sending unit 504 may include:

a first flow table matching unit (not shown), configured to match the packet with a first flow table by using a virtual local area network identification (VLAN ID) of the packet and a destination Internet Protocol (IP) address, where the first flow table is used for instructing sending the packet to a second physical machine by means of a tunneling technique, and the second physical machine is a host machine for a virtual machine associated with the destination IP address of the packet; and a first flow table generation unit (not shown), configured to: when there is no match in the first flow table for the packet, send the packet to a Software Defined Networking (SDN) controller, query for a destination VLAN ID and a destination IP address by using the controller, generate a first new flow table, insert the first new flow table into the first flow table, and send the packet to the second physical machine according to the first new flow table by means of a tunneling technique.

Specific implementation of the first flow table matching unit and the technical effects achieved thereby can be referred to the related description of step 3041 in the embodiment corresponding to FIG. 3, and will not be repeatedly described here. Specific implementation of the first flow table generation unit and the technical effects achieved thereby can be referred to the related description of step 3042 in the embodiment corresponding to FIG. 3, and will not be repeatedly described here.

In an optional implementation of this embodiment, the packet sending unit 504 may further include:

a second flow table matching unit (not shown), configured to: when there is no match in the second flow table for the packet, match the packet with a third flow table according to a source VLAN ID of the packet, where the third flow table is used for instructing sending the pack a second flow table generation unit (not shown), configured to: when there is no match in the third flow table for the packet, upload the packet to the controller, generate a second new flow table by using the controller, send the packet to the network node of the gateway associated with the destination IP address of the packet according to the second new flow table, and insert the second new flow table into the third flow table.

Specific implementation of the second flow table matching unit and the technical effects achieved thereby can be referred to the related description of step 3043 in the embodiment corresponding to FIG. 3, and will not be repeatedly described here. Specific implementation of the second flow table generation unit and the technical effects achieved thereby can be referred to the related description of step 3044 in the embodiment corresponding to FIG. 3, and will not be repeatedly described here.

In some implementations of this embodiment, the ARP response sending unit 503 is further configured to: when the packet is the ARP request packet and the destination address of the packet is an address of the virtual machine in the first physical machine, return the ARP response through an integration bridge to the first physical machine.

Figure 6:
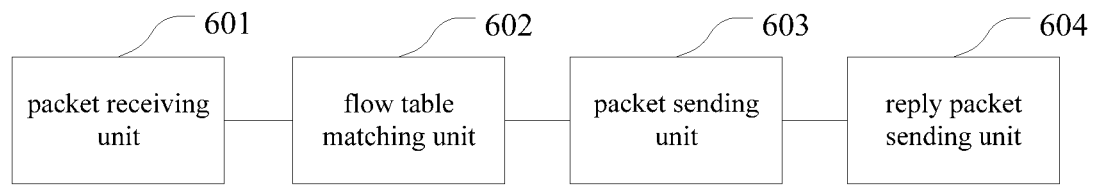
FIG. 6 is a schematic structural diagram of a communication processing apparatus according to another embodiment of the present application.

Referring to FIG. 6, as an implementation of the method shown in FIG. 4, the present application provides another embodiment of a communication processing apparatus. The apparatus may be specifically applied to the network structure shown in FIG. 1, and may be applied to a receiving end of communication.

As shown in FIG. 6, the communication processing apparatus 600 according to this embodiment includes a packet receiving unit 601, a flow table matching unit 602, a packet sending unit 603, and a reply packet sending unit 604. The packet receiving unit 601 is configured to receive a packet through a tunnel bridge. The flow table matching unit 602 is configured to match the packet with a flow table according to a tunnel identification code, a destination physical address, and a destination Internet Protocol (IP) address of the packet, where the destination physical address in a header field of the flow table is a predetermined pseudo physical address, and the flow table is used for instructing changing a source physical address in the matched packet to the pseudo physical address, and change the destination physical address to a real physical address corresponding to the destination IP address of the packet. The packet sending unit 603 is configured to send the packet to a virtual machine associated with a destination address of the packet. The reply packet sending unit 604 is configured to send a reply packet corresponding to the packet to a physical machine at a sending end by means of a tunneling technique.

In this embodiment, the packet sending unit 603 may include:

a packet sending subunit (not shown), configured to: when there is locally a virtual machine associated with the destination IP address of the packet, send the packet to the virtual machine; and a flow table generation unit (not shown), configured to: when there is locally no virtual machine associated with the destination IP address of the packet, send the packet to the controller, generate a flow table of a physical machine where the destination IP address of the packet is located by using the controller, and send the flow table to the physical machine that sends the packet.

In this embodiment, the flow table generation unit generating a flow table of a physical machine where the destination IP address of the packet is located by using the controller for example, may include: searching for the physical machine where the destination IP address of the packet is located by using the controller according to a tunnel identifier, a source IP address and the destination IP address of the packet, and generating the flow table.

Specific implementation of the reply packet sending unit 604 and the technical effects achieved thereby can be referred to the related description of step 404 in the embodiment corresponding to FIG. 4, and will not be repeatedly described here.

According to the communication processing apparatus provided in this embodiment, the flow table matching unit 602 changes the destination physical address in the matched packet to the real physical address corresponding to the destination IP address of the packet, so that the packet can reach the correct destination virtual machine, thus completing the entire communication process. In addition, the flow table matching unit 602 changes the source physical address in the matched packet to the pseudo physical address, so that the reply packet does not need to be sent to the gateway for finding the sending end, and therefore does not need to be processed by the network node, thereby alleviating the load of the network node.

According to another aspect, the present application further provides a computer readable storage medium. The computer readable storage medium may be the computer readable storage medium included in the apparatus in the above-mentioned embodiments, or a stand-alone computer readable storage medium which has not been assembled into the apparatus. The above-mentioned computer readable storage medium stores one or more programs. The above-mentioned one or more programs cause one or more processors, when being executed by the one or more processors, to execute the communication processing method described in the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A communication processing method, comprising:
receiving, through a tunnel bridge to a first physical machine, a packet sent from a virtual machine, the first physical machine being a host machine of the virtual machine;
determining whether the packet is an Address Resolution Protocol (ARP) request packet;
if the packet is the ARP request packet and a destination address of the packet is not an address of the virtual machine in the first physical machine, writing a predetermined pseudo physical address into an ARP response and returning the ARP response; and
if the packet is not the ARP request packet, sending the packet to a terminal associated with the destination address of the packet wherein the sending the packet to a terminal associated with the destination address of the packet comprises:
matching the packet with a first flow table by using a Virtual Local Area Network Identification (VLAN ID) of the packet and a destination Internet Protocol (IP) address, wherein the first flow table is used for instructing sending the packet to a second physical machine by means of a tunneling technique, and the second physical machine is a host machine for a virtual machine associated with the destination IP address of the packet; and if there is no match in the first flow table for the packet, sending the packet to a Software Defined Networking (SDN) controller, querying for a destination VLAN ID and a destination IP address by using the controller to generate a first new flow table, inserting the first new flow table into the first flow table, and sending the packet to the second physical machine according to the first new flow table by means of a tunneling technique.

2. The method according to claim 1, the method further comprising:
if the packet is the ARP request packet and the destination address of the packet is the address of the virtual machine in the first physical machine, returning the ARP response through an integration bridge to the first physical machine.

3. The method according to claim 1, wherein the sending the packet to a Software Defined Networking (SDN) controller comprises:
matching the packet with a second flow table by using Classless Inter-Domain Routing (CIDR) of the packet, wherein the second flow table is used for instructing sending the matched packet to the controller.

4. The method according to claim 3, wherein the sending the packet to a terminal associated with the destination address of the packet further comprises:
if there is no match in the second flow table for the packet, matching the packet with a third flow table according to a source VLAN ID of the packet, wherein the third flow table is used for instructing sending the packet to a network node of a gateway associated with the destination IP address of the packet; and
if there is no match in the third flow table for the packet, uploading the packet to the controller, generating a second new flow table by using the controller, sending the packet to the network node of the gateway associated with the destination IP address of the packet according to the second new flow table, and inserting the second new flow table into the third flow table.

5. The method according to claim 4, wherein the uploading the packet to the controller comprises: matching the packet with a fourth flow table according to the source VLAN ID of the packet, wherein the fourth flow table is used for instructing uploading the matched packet to the controller.

6. A non-transitory computer storage medium storing computer readable instructions that can be executed by a processor, the computer readable instructions when executed by the processor, causing the processor to execute the method according to claim 1.

7. A communication processing method, comprising:
receiving a packet through a tunnel bridge;
matching the packet with a flow table according to a tunnel identification code, a destination physical address, and a destination Internet Protocol (IP) address of the packet, wherein the destination physical address in a header field of the flow table is a predetermined pseudo physical address, and the flow table is used for instructing changing a source physical address in the matched packet to the pseudo physical address, and changing the destination physical address to a real physical address corresponding to the destination IP address of the packet;
sending the packet to a virtual machine associated with a destination address of the packet; and
sending a reply packet corresponding to the packet to the physical machine at a sending end by means of a tunneling technique;
wherein the sending the packet to a virtual machine associated with a destination address of the packet comprises:
if there is locally a virtual machine associated with the destination IP address of the packet, sending the packet to the virtual machine; and
if there is locally no virtual machine associated with the destination IP address of the packet, sending the packet to the controller, generating a flow table of a physical machine where the destination IP address of the packet is located by using the controller, and sending the packet to the virtual machine associated with the destination address of the packet according to the flow table.

8. The method according to claim 7, wherein the generating a flow table of a physical machine where the destination IP address of the packet is located by using the controller comprises:
searching for the physical machine where the destination IP address of the packet is located by using the controller according to a tunnel identifier, a source IP address and the destination IP address of the packet, and generating the flow table.

9. A communication processing apparatus, comprising:
at least one processor; and
a memory storing instructions, which when executed by the at least one processor, cause the at least one processor to perform operations, the operations comprising:
receiving, through a tunnel bridge to a first physical machine, a packet sent from a virtual machine, the first physical machine being a host machine of the virtual machine;
determining whether the packet is an Address Resolution Protocol (ARP) request packet;

if the packet is the ARP request packet and a destination address of the packet is not an address of a virtual machine in the first physical machine, writing a predetermined pseudo physical address into an ARP response and returning the ARP response; and if the packet is not the ARP request packet, sending the packet to a terminal associated with the destination address of the packet;

wherein the sending the packet to a terminal associated with the destination address of the packet comprises:

matching the packet with a first flow table by using a Virtual Local Area Network Identification (VLAN ID) of the packet and a destination Internet Protocol (IP) address, wherein the first flow table is used for instructing sending the packet to a second physical machine by means of a tunneling technique, and the second physical machine is a host machine for a virtual machine associated with the destination IP address of the packet; and if there is no match in the first flow table for the packet, sending the packet to a Software Defined Networking (SDN) controller, querying for a destination VLAN ID and a destination IP address by using the controller to generate a first new flow table, inserting the first new flow table into the first flow table, and sending the packet to the second physical machine according to the first new flow table by means of a tunneling technique.

10. The apparatus according to claim 9, the operations further comprising:

if the packet is the ARP request packet and the destination address of the packet is an address of the virtual machine in the first physical machine, returning the ARP response through an integration bridge to the first physical machine.

11. The apparatus according to claim 10, wherein the sending the packet to a Software Defined Networking (SDN) controller comprises:

matching the packet with a second flow table by using Classless Inter-Domain Routing (CIDR) of the packet, wherein the second flow table is used for instructing sending the matched packet to the controller.

12. The apparatus according to claim 11, wherein the sending the packet to a terminal associated with the destination address of the packet further comprises:

if there is no match in the second flow table for the packet, matching the packet with a third flow table according to a source VLAN ID of the packet, wherein the third flow table is used for instructing sending the packet to a network node of a gateway associated with the destination IP address of the packet; and if there is no match in the third flow table for the packet, uploading the packet to the controller, generating a second new flow table by using the controller, sending the packet to the network node of the gateway associated with the destination IP address of the packet according to the second new flow table, and inserting the second new flow table into the third flow table.

13. The apparatus according to claim 12, wherein the uploading the packet to the controller comprises: matching the packet with a fourth flow table according to the source VLAN ID of the packet, wherein the fourth flow table is used for instructing uploading the matched packet to the controller.

14. A communication processing apparatus, comprising:
at least one processor; and
a memory storing instructions, which when executed by the at least one processor, cause the at least one processor to perform operations, the operations comprising:

receiving a packet through a tunnel bridge;

matching the packet with a flow table according to a tunnel identification code, a destination physical address, and a destination Internet Protocol (IP) address of the packet, wherein the destination physical address in a header field of the flow table is a predetermined pseudo physical address, and the flow table is used for instructing changing a source physical address in the matched packet to the pseudo physical address, and changing the destination physical address to a real physical address corresponding to the destination IP address of the packet;

sending the packet to a virtual machine associated with a destination address of the packet; and sending a reply packet corresponding to the packet to the physical machine at a sending end by means of a tunneling technique;

wherein the sending the packet to a virtual machine associated with a destination address of the packet comprises:

if there is locally a virtual machine associated with the destination IP address of the packet, sending the packet to the virtual machine; and if there is locally no virtual machine associated with the destination IP address of the packet, sending the packet to the controller, generating a flow table of a physical machine where the destination IP address of the packet is located by using the controller, and sending the packet to the virtual machine associated with the destination address of the packet according to the flow table.

15. The apparatus according to claim 14, wherein the generating a flow table of a physical machine where the destination IP address of the packet is located by using the controller comprises:

searching for the physical machine where the destination IP address of the packet is located by using the controller according to a tunnel identifier, a source IP address and the destination IP address of the packet, and generating the flow table.

* * * * *